US009589277B2

(12) United States Patent
Zhang et al.

(10) Patent No.: US 9,589,277 B2
(45) Date of Patent: Mar. 7, 2017

(54) SEARCH SERVICE ADVERTISEMENT SELECTION

(71) Applicant: MICROSOFT TECHNOLOGY LICENSING, LLC, Redmond, WA (US)

(72) Inventors: Bruce Zhang, Mountain View, CA (US); Jianchang Mao, Bellevue, WA (US); Yuan Shen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 14/145,422

(22) Filed: Dec. 31, 2013

(65) Prior Publication Data
US 2015/0186938 A1 Jul. 2, 2015

(51) Int. Cl.
*G06Q 30/02* (2012.01)
*G06N 99/00* (2010.01)

(52) U.S. Cl.
CPC ....... *G06Q 30/0256* (2013.01); *G06N 99/005* (2013.01)

(58) Field of Classification Search
CPC ................................................ G06Q 30/0256
See application file for complete search history.

(56) References Cited

U.S. PATENT DOCUMENTS

| 7,146,361 | B2 | 12/2006 | Broder et al. |
| 7,512,602 | B2 | 3/2009 | Broder et al. |
| 8,280,903 | B2 | 10/2012 | Broder et al. |
| 8,380,570 | B2 | 2/2013 | Agarwal et al. |
| 2009/0254512 | A1 | 10/2009 | Broder et al. |
| 2012/0166445 | A1* | 6/2012 | Chakrabarti ...... G06F 17/30864 707/742 |

OTHER PUBLICATIONS

Chakrabarti, et al., "Contextual Advertising by Combining Relevance with Click Feedback" In Proceedings of the 17th International Conference on World Wide Web, Apr. 21, 2008, 10 pages.
Raghavan, et al., "Evaluating Vector-Space and Probabilistic Models for Query to Ad Matching", In Proceedings of Information Retrieval in Advertising, Jun. 2007, 8 pages.
Wang, et al., "A Search-based Method for Forecasting Ad Impression in Contextual Advertising" In Proceedings of the 18th International Conference on World Wide Web, Apr. 20, 2009, 10 pages.
(Continued)

*Primary Examiner* — David Stoltenberg
*Assistant Examiner* — Robert C Johnson
(74) *Attorney, Agent, or Firm* — Steven Spellman; Tom Wong; Micky Minhas

(57) ABSTRACT

Methods, computer systems, and computer storage media are provided for evaluating information retrieval (IR) such as search query results (including advertisements) by a machine learning scorer. In an embodiment, a set of features is derived from a query and a machine learning algorithm is applied to construct a linear model of (query, ads) for scoring by maximizing a relevance metric. In an embodiment, the machine learned scorer is adapted for use with WAND algorithm based ad selection.

20 Claims, 4 Drawing Sheets

(56) References Cited

OTHER PUBLICATIONS

Agarwal, et al.,"Fast Top-k Retrieval for Model Based Recommendation" In Proceedings of the Fifth ACM International Conference on Web Search and Data Mining, Feb. 8, 2012, 10 pages.

Raghavan, et al., "Probabilistic First Pass Retrieval for Search Advertising: From Theory to Practice" In Proceedings of the 19th ACM International Conference on Information and Knowledge Management, Oct. 30, 2010, 10 pages.

Broder, et al "Search Advertising using Web Relevance Feedback" In Proceedings of the 17th ACM Conference on Information and Knowledge Management, Oct. 26, 2008, 10 pages.

Hillard, et al., "Improving Ad Relevance in Sponsored Search" In Proceedings of the third ACM International Conference on Web Search and Data Mining, Feb. 3, 2010, 9 pages.

Broder, et al., "Efficient Query Evaluation using a Two-Level Retrieval Process" In Proceedings of the Twelfth International Conference on Information and Knowledge Management, Nov. 3, 2003, 9 pages.

Anagnostopoulos, et al., "Sampling Search-Engine Results" Iln Proceedings of the 14th International Conference on World Wide Web, May 10, 2010, 32 pages.

* cited by examiner

SEARCH SERVICE ADVERTISEMENT SELECTION

BACKGROUND

A search service, such as an online search engine, search application, or "app," or application with search capability can monetize its services by selling advertising space to advertisers including marketers, or third-parties. The search service receives revenue from advertisers when an advertisement is displayed along with the search results or when a user selects or clicks on the displayed advertisement. Advertisers paying for ads expect the search service to present the ads with search results from queries that are relevant to the ads. Therefore a goal for any search service is to present relevant advertisements to users thereby increasing the likelihood that the users will interact with the advertisements.

Ad selection algorithms attempt to identify relevant ads by inferring user intent behind the user-submitted queries. But in practice, achieving an accurate understanding of a user's intent behind a query, including a long tail search query, and retrieving ads with both high recall and precision presents a difficult problem for selection algorithms. Moreover the ad selection algorithms also face practical constraints including low computing cost and latency as well as high throughput to serve high volume traffic.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention relate generally to evaluating information retrieval (IR), such as search query results, by a machine learning based system for ad selection. In this regard, systems, methods, and computer-storage media are provided for, among other things, a machine learned IR scorer for use in ad selection. In some embodiments, a set of features derived from a query (or reference) and the advertisements (or target) is determined and a machine learning algorithm is applied to construct a linear model of (query, ads) (or (reference, target) for scoring by maximizing a relevance metric. In some embodiments of the present invention, the machine learned scorer is adapted for use with WAND algorithm-based ad selection.

BRIEF DESCRIPTION OF THE DRAWINGS

Embodiments of the invention are described in detail below with reference to the attached drawing figures, wherein.

DETAILED DESCRIPTION

Figure 1:
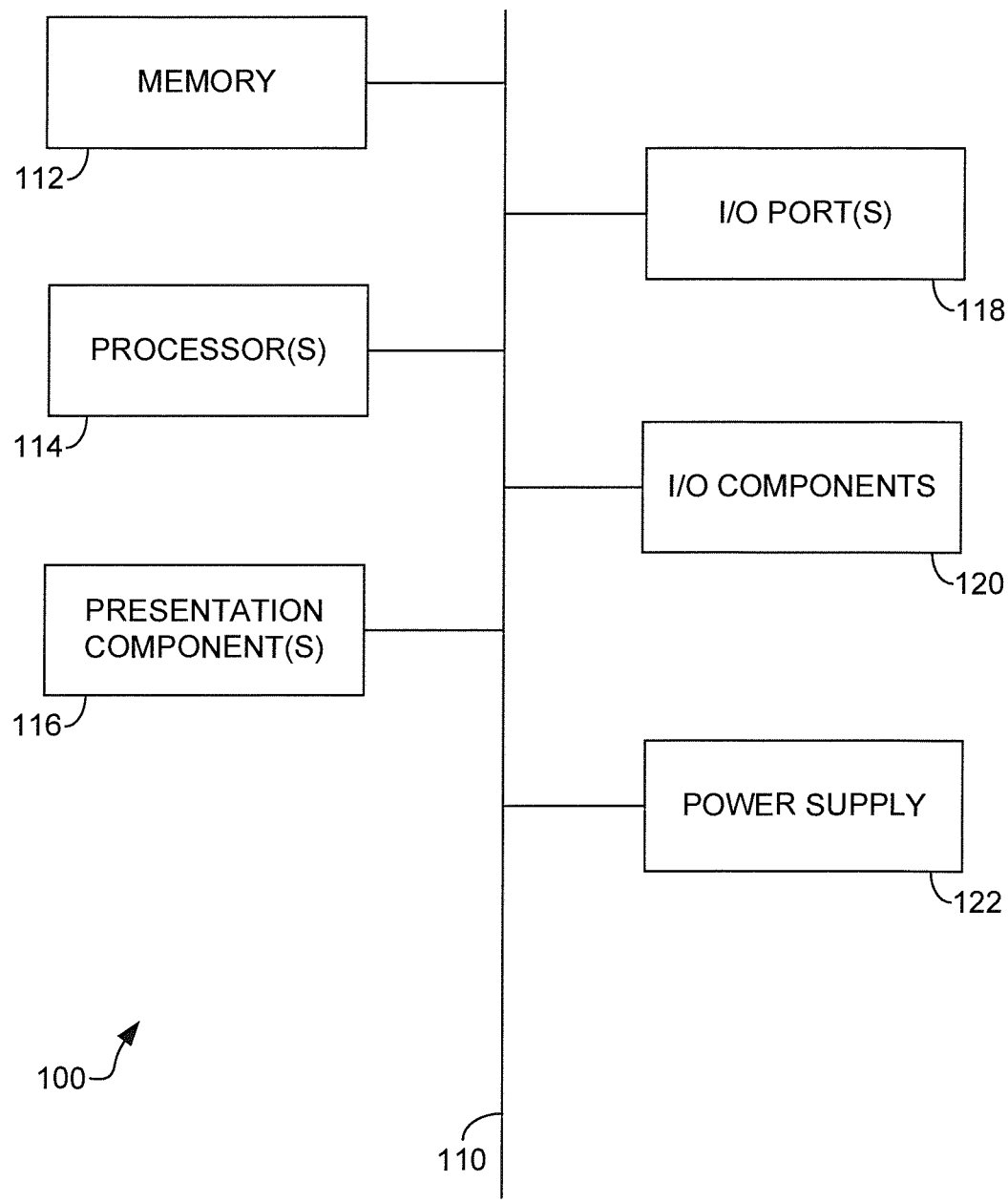
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate generally to evaluating information retrieval (IR), such as search query results, by a machine learning model for use in ad selection. A goal of ad selection, especially for paid search services or advertisement search services, is to identify ads relevant to a user's intention behind user-submitted queries. Thus, algorithm(s) implemented for ad selection need to retrieve relevant ads with high recall and precision. Additionally, the practical use of such algorithms necessitates a low computing cost and latency and a high throughput capable of serving high volume traffic.

For a given a user query, the WAND algorithm provides a framework for the ads selection process. The term WAND is a Boolean predicate and stands for Weighted AND. The WAND operator receives, as arguments, a list of Boolean variables, $X_1, X_2, \ldots X_k$, a list of associated weights $w_1, w_2, \ldots, w_k$, and an "upper-bound" threshold $\theta$. The operator is defined as true for WAND($X_1, w_1, \ldots X_k, w_k, \theta$), if and only if:

$$\sum_{1 \leq i \leq k} x_i w_i \geq \theta,$$

where $x_i$, the indicator variable for $X_i$, is given as $x_i=1$, if $X_i$ is true, and $x_i=0$, otherwise. Accordingly, the WAND operator can implement an OR operation as WAND($X_1,1, X_2,1, \ldots Xk,1, 1$); similarly WAND can implement an AND operation as WAND($X_1,1, X_2,1, \ldots Xk,1, k$). Thus, by varying the threshold $\theta$, the WAND operator can vary from operating like an OR or an AND.

An approach to ad selection, using the WAND algorithm framework, applies a two-step process for evaluating content similarity such as determined by a quality score of relevance between query and an ad. The first step determines an upper bound score for the ad-query pair. If this score is above a threshold, such as a predefined threshold decided by the minimal score in a heap, then the evaluation process proceeds to a second step comprising a full evaluation based on traditional IR scoring, such as determining Cosine Similarity between vectors derived from the query and ad. In this way, a large number of ads can be skipped (or "escaped") for full evaluation without false negatives so that the efficiency of scoring is improved substantially. However, this approach to ad selection has significant problems. For example, there are many parameters (greater than thirty) in this approach that require tuning by trial and error. For example, where term-frequency-inverse-document-frequency ("tf-idf") is utilized, the field or position of a term in a document, such as the title, body, description, or other field, affects the weighting of the term. Accordingly terms must be tuned empirically. Additionally, Cosine Similarity scoring is heuristic and thus not optimal in terms of relevance measurement.

In this regard, embodiments of the present invention facilitate ad selection without requiring parameters to be tuned empirically or requiring relevance scoring by less optimal processes, such as Cosine Similarity. In particular, systems, methods, and computer-storage media are provided for, among other things, a machine learned IR scorer for use in ad selection that overcomes the problems facing traditional ad selection algorithms. In some embodiments, a set of features derived from a query (or reference) and the ads (or target) is determined and a machine learning algorithm is applied to construct a linear model of (query, ads) (or (reference, target) for scoring by maximizing a relevance metric. Further, in some embodiments of the present invention, the machine learned IR scorer is adapted for use with WAND algorithm-based ad selection. By combining the WAND algorithm with the machine learned scorer, both high precision/recall and high efficiency in online ads selection is achieved.

In this way, embodiments of the invention facilitate determining information items relevant to a reference such as a user-submitted query, including long or short tail queries, seed, keyword(s), document, or other similar reference information, which may be provided from a user, service, application or app, web page or web script, for example. Accordingly, by way of example only embodiments of the invention may benefit users by providing ranked relevant documents or pages based on a user's query. Similarly, by way of example only embodiments of the invention may benefit advertisers by providing list(s) of suggested bidded keywords based on an advertiser's seed keywords that the advertiser wants to buy. Furthermore, embodiments of the present invention satisfy practical constraints for ad selection algorithms have low computing cost and latency and a high throughput capable of serving high volume traffic.

Accordingly, in one embodiment, the present invention is directed to one or more computer-storage media having computer-executable instructions embodied thereon that, when executed by a computing device, cause the computing device to perform a method of selecting relevant advertisements based on a machine-learning model. The method comprises receiving historical click-usage information comprising user-click or publisher click data for an advertisement and a query, and training a machine learning model with the received historical click usage information. The method further comprises receiving a set of advertisement documents, each document of the set including one or more advertising terms, receiving a query comprising one or more query-terms, and identifying ad-query pairs to be evaluated for relevance to each other, thereby forming a set of ad-query pairs. In an embodiment, a machine learned scorer adapted WAND algorithm is applied to the set of ad-query pairs to generate a set of potentially relevant ad-query pairs and rank them based on a full evaluation score from the machine learned scorer. In an embodiment, the machine learning model is then applied to the set of potentially relevant ad-query pairs to determine a degree of relevance between each potentially relevant ad-query pair.

In another embodiment, the present invention is directed to a computer system for performing a method of selecting relevant advertisements based on a machine-learning model. The system comprises a computing device associated with an advertisement search service having one or more processors and one or more computer-storage media, and a data store coupled with the advertisement search service. The advertisement search service receives at least a portion of a search query in association with a query-input region of a screen display and provides at least one relevant advertisement from a set of available advertisements, the relevant advertisement presented with query results. The system further comprises a machine learning scorer component for scoring relevance between the search query and the available advertisements based on training data comprising historical click usage information.

Having briefly described an overview of embodiments of the present invention, an exemplary operating environment in which embodiments of the present invention may be implemented is described below in order to provide a general context for various aspects of the present invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-usable or computer-executable instructions such as program modules or components, being executed by a computer or other machine, such as a personal data assistant, a smart phone, a tablet PC, or other handheld device. Generally, program components including routines, programs, objects, modules, components, data structures, and the like, refer to code that performs particular tasks, or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program components or modules may be located in both local and remote computer storage media including memory storage devices.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media may be any available media that is accessible by the computing device 100 and includes both volatile and nonvolatile media, removable and nonremovable media. Computer-readable media comprises computer-storage media and communication media.

Computer-storage media includes volatile and nonvolatile, removable and nonremovable media implemented in any method or technology for storage of information such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As defined herein, computer-storage media does not include communication media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, and the like. Although memory 112 is illustrated as a single component, it may be distributed across multiple locations or in the cloud.

Computing device 100 includes one or more processors 114 that read data from various entities such as memory 112 or I/O components 120. As can be appreciated, the one or more processors 114 may comprise a central processing unit (CPU). Presentation component(s) 116 present data indications to a user or other device. Exemplary presentation components 116 include a display device, speaker, printing component, vibrating component, and the like. I/O ports 118 allow computing device 100 to be logically coupled to other devices including I/O components 120, some of which may be built in. Illustrative I/O components 120 include a microphone, joystick, game pad, satellite dish, scanner, printer, wireless device, and the like.

Furthermore, although the term "server" is often used herein, it will be recognized that this term may also encompass a search engine, an advertisement search service, a Web browser, a cloud server, a set of one or more processes distributed on one or more computers, one or more stand-alone storage devices, a set of one or more other computing or storage devices, a combination of one or more of the above, and the like.

Figure 2:
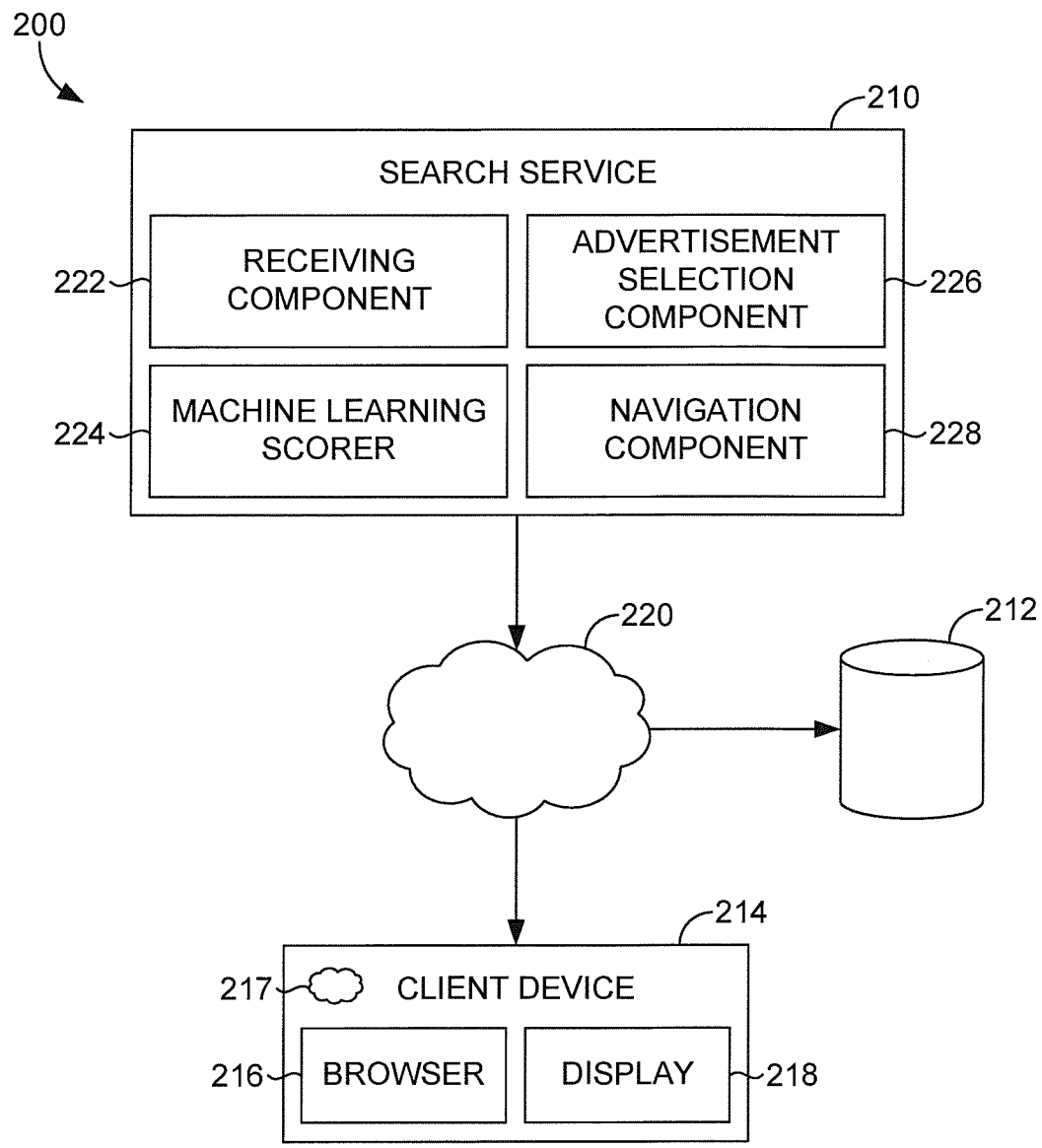
FIG. 2 is a block diagram of an exemplary system for providing relevant advertisements based on user queries suitable for use in implementing embodiments of the present invention.

Referring now to FIG. 2, a block diagram is provided illustrating an exemplary computing system 200 in which embodiments of the present invention may be employed.

Generally, the computing system 200 illustrates an environment in which search queries are evaluated for relevance to target information, such as advertisements, for determining relevant advertisements to be presented to a user. In an embodiment, the relevant advertisements may be selected from a set or subset of candidate advertisements and presented in conjunction with other information such as search query results. In an embodiment, relevant target information is presented in response to a received query or other reference information. In one aspect, the relevant advertisements (or target information) are presented in an area of the display screen that is easily viewable by the user. Additionally, the relevant advertisements may be presented before search results are shown or alongside, after, or intermingled with the search results to further increases the likelihood of user engagement with the advertisement.

Among other components not shown, the computing system 200 generally includes an information retrieval service, such as advertisement search service 210, its associated data store 212, and a client device 214, all in communication with one another via a network 220. The network 220 may include, without limitation, one or more local area networks (LANs) and/or wide area networks (WANs). Such networking environments are commonplace in offices, enterprise-wide computer networks, intranets and the Internet. Accordingly, the network 220 is not further described herein.

It should be understood that any number of client computing devices and advertisement search services may be employed in the computing system 200 within the scope of embodiments of the present invention. Each may comprise a single device/interface or multiple devices/interfaces cooperating in a distributed environment. For instance, the advertisement search service 210 (or another information retrieval service) may comprise multiple devices and/or modules arranged in a distributed environment that collectively provide the functionality of the advertisement search service 210 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 214, as an Internet-based service, as a third-party application service, or as a module inside the advertisement search service 210. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search services, third-party applications, or client computing devices. By way of example only, the advertisement search service 210 or another information retrieval service might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 214 may include any type of computing device, such as the computing device 100 described with reference to FIG. 1, for example. Generally, the client computing device 214 may include a browser 216, one or more third-party applications 217, and a display 218. The browser 216, among other things, is configured to render search home pages (or other online landing pages), and render search results pages (SRPs) in association with the display 218 of the client computing device 214. The browser 216 is further configured to receive user input of requests for various Web pages (including search home pages and results pages), receive user-inputted search queries (generally inputted via a user interface presented on the display 218 and permitting alpha-numeric and/or textual input, voice input, and/or gesture input into a designated search box), and to receive content for presentation on the display 218, for instance, from the advertisement search service 210 (or information retrieval service). The browser 216 may be any suitable type of Web browser such as Internet Explorer®, Firefox®, Chrome®, Safari®, or other type of software configured to enable submission of search queries as disclosed herein. It should be noted that the functionality described herein as being performed by the browser 216 may be performed by any other application capable of rendering Web content or other content from advertisement search service 210 (or an information retrieval service). Any and all such variations, and any combination thereof, are contemplated to be within the scope of embodiments of the present invention.

The third-party application 217 (otherwise known by the term "app") broadly pertains to application software designed to be executed by an operating system hosted on a computing device, a remote cloud-based server, or a combination of both; the application software assists the user in performing specific tasks. In operation, applications provide digital solutions in the real world, such as word processing, gaming, communication-based interfaces, etc. Examples of applications include enterprise software, accounting software, office suites, graphics software, and media players and include such popular applications as GROUPON®, SHAZAM®, OPENTABLE®, YELP®, and the like. It should be understood and appreciated that the definition of applications is not limited to the scope of examples provided herein and may include any code that carries out one or more operations when executed.

The third-party application 217, among other things, is configured to render application home pages as well as application result pages in association with the display 218 of the client computing device 214. The third-party application 217 is further configured to receive user input of requests for various application pages (including home pages and results pages), receive user-inputted search queries (generally inputted via a user interface presented on the display 218 and permitting alpha-numeric and/or textual input, voice input, and/or gesture input into a designated search box), and to receive content for presentation on the display 218, for instance, from the advertisement search service 210 or another information retrieval service.

The display 218 is configured to present various content including, without limitation, browser home pages, search engine home pages, and/or third-party application pages having a query-input region, results and results pages, including relevant advertisements or other relevant target information, as described herein. As used throughout this application, the term "results page" is meant to encompass Web pages such as search engine results pages and result pages or documents associated with search-type applications, either standalone or embedded in other applications (e.g., Xbox®, Microsoft® Office, and the like). In embodiments, the display 218 is further configured to enable touch inputs, auditory inputs, and/or gesture inputs from a user.

Advertisement search service 210 is configured to receive and respond to requests that it receives from components associated with client computing devices, for instance, the browser 216, and/or the third-party application 217 associated with the client computing device 214. Those skilled in the art of the present invention will recognize that the present invention may be implemented with any number of searching utilities or information retrieval services. For example, an Internet search engine or service, a database search engine, and/or a third-party search application may utilize the present invention. These searching utilities are well known in the art, and commercially available searching utilities share many similar processes not further described herein.

As illustrated, the advertisement search service 210 includes a receiving component 222, a machine-learning scorer component 224, an advertisement-selection component 226, and a navigation component 228. In some embodiments, one or more of the components 222, 224, 226, and 228 may be implemented as stand-alone applications. In other embodiments, one or more of the components 222, 224, 226, and 228 may be integrated directly into the operating system of a computing device such as the computing device 100 of FIG. 1 or the client device 214. It will be understood that the components 222, 224, 226, and 228 illustrated in FIG. 2 are exemplary in nature and in number and should not be construed as limiting. Any number of components may be employed to achieve the desired functionality within the scope of embodiments hereof.

The illustrated advertisement search service 210 also has access to the data store 212. The data store 212 is configured to store information for use by, for example, the advertisement search service 210. The information stored in association with the data store 212 is configured to be searchable for one or more items of information stored in association therewith. The information stored in association with the data store 212 may comprise general information used by the advertisement search service 210. For example, the data store 212 may store information concerning recorded search and click behavior of users in general, including user-click data and publisher-click data, or when permitted, a log of a particular user's search behavior. The data store 212 may also store cached search results corresponding to search queries and advertisements, which may be stored or accessed by inverted index wherein each token (such as a term or word) has a corresponding post listing which contains addresses to the ads that have that token in their metadata or otherwise correspond to that token. The advertisements may include query-refinement advertisements as well as non-query refinement advertisements that are supplied by third-parties. The third-parties, in turn, may comprise companies that sell products or services, or third-party agencies that work in conjunction with companies to promote the sale of the products or services.

The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the advertisement search service 210, the client device 214, and/or any combination thereof.

The receiving component 222 of the advertisement search service 210 is configured to receive a variety of inputs including search queries or portions of search queries inputted via, for example, the display 218 of the client device 214. As used throughout this application, the term "search query" or "portion of a search query" encompasses one or more inputted characters, letters, words, terms, phrases, and the like.

The machine-learning scorer component 224 is configured to determine probability for target (such as ad document) relevance to a reference, such as a user-query received via receiving component 222. In an embodiment, the relevance may be quantitatively evaluated as a substitute for the measure of similarity determined by, for example, Cosine Similarity, by using a trained machine-learning scorer (i.e. a "machine-learned scorer").

Machine learning scorer component 224 may be embodied as a machine learning model configured for determining the weights for each term, word, or feature in the reference/query and target/advertisement document, and in an embodiment for determining the probability that a target document (such as an ad) is relevant to the reference (query). Embodiments of the machine learning model may be linear or non-linear, and the selection of the model is application and data dependent. In an embodiment, a linear model is used to reduce computing complexity and facilitate adaptation to the WAND algorithm, which uses a dot-product.

In an embodiment, the machine learning scorer is based on a logistic regression model such as an L1-regularized logistic regression model.

$$\min_w \left\{ -\sum_i \{\log[P(R \mid (q, a)_i; w] * y_i + \log[1 - P(R \mid (q, a)_i; w] * (1 - y_i)\} + \alpha * \|w\|_1 \right\} \quad (1)$$

$$P(R \mid (q, a); w) = \frac{1}{1 + e^{-w \cdot f}} \quad (2)$$

Logistic regression models the probability distribution of the class label R given a feature vector (q,a) as in Equation (2), where w is the parameters of the logistic regression model; $y_i$ represents the label of the document, for query document i; and P is the probability calculated based on current w. In particular, in an embodiment, w represents the weights, and is a dot-product which can be used in the WAND operator. Thus the L1 regularized logistic regression is suitable for feature selection.

In embodiments, machine-learning model performance can be quantitatively evaluated using a loss function and minimizing the loss, which improves accuracy of the model. Accordingly, the model may be trained by determining a weight to minimize Equation (1). In an embodiment, an optimization algorithm is used to solve for w which minimizes Equation (1). For example, in an embodiment, a Newton-like method for optimization, such as L-BFGS or LM-BFGS, may be utilized. LBFGS is an optimization algorithm in the family of quasi-Newton methods that approximates the Broyden-Fletcher-Goldfarb-Shanno (BFGS) algorithm using a limited amount of computer memory. It is contemplated that other optimization algorithms may be used as well.

In an embodiment, the machine-learning scorer 224 is implemented as a sparse linear model using training data including click-data from data store 212. For example, in one embodiment reduced to practice, a large set of training data on COSMOS was utilized to train the model.

The advertisement-selection component 226 is configured to select and present one or more advertisements (ads) or target documents based on relevance to a query or reference as determined by the machine learning scorer 224. In an embodiment the selection or presentation of ads is based, at least in part, on a ranking of the relevance. In an embodiment, the advertisements may include sponsored advertisements provided by one or more third-parties, and may be stored in association with a data store such as the data store 212. In one aspect, the third-party that provides the advertisement specifies metadata such as details regarding keywords, advertising content, phrases, or other information for use in evaluating relevance to a query or reference. In an embodiment, this information comprises an inverted index based on the advertisements such that each token such as a word or term has a post listing which contains all the ads that have this token in its metadata. In another aspect, such an inverted index is generated based on the full ads inventory corpus. In an embodiment, the inverted index is referenced by advertisement-selection component 226 for retrieving advertisements or information about advertisements, such as metadata, based on index tokens.

The navigation component 228 is configured to navigate to landing pages upon receiving a selection of, for example, an advertisement. The landing pages may comprise Web pages sponsored by the company that provides the advertisement. The landing pages may also comprise application pages, including sponsored application pages, and documents, including local or remotely-located documents that are determine relevant to a query or reference.

Figure 3:
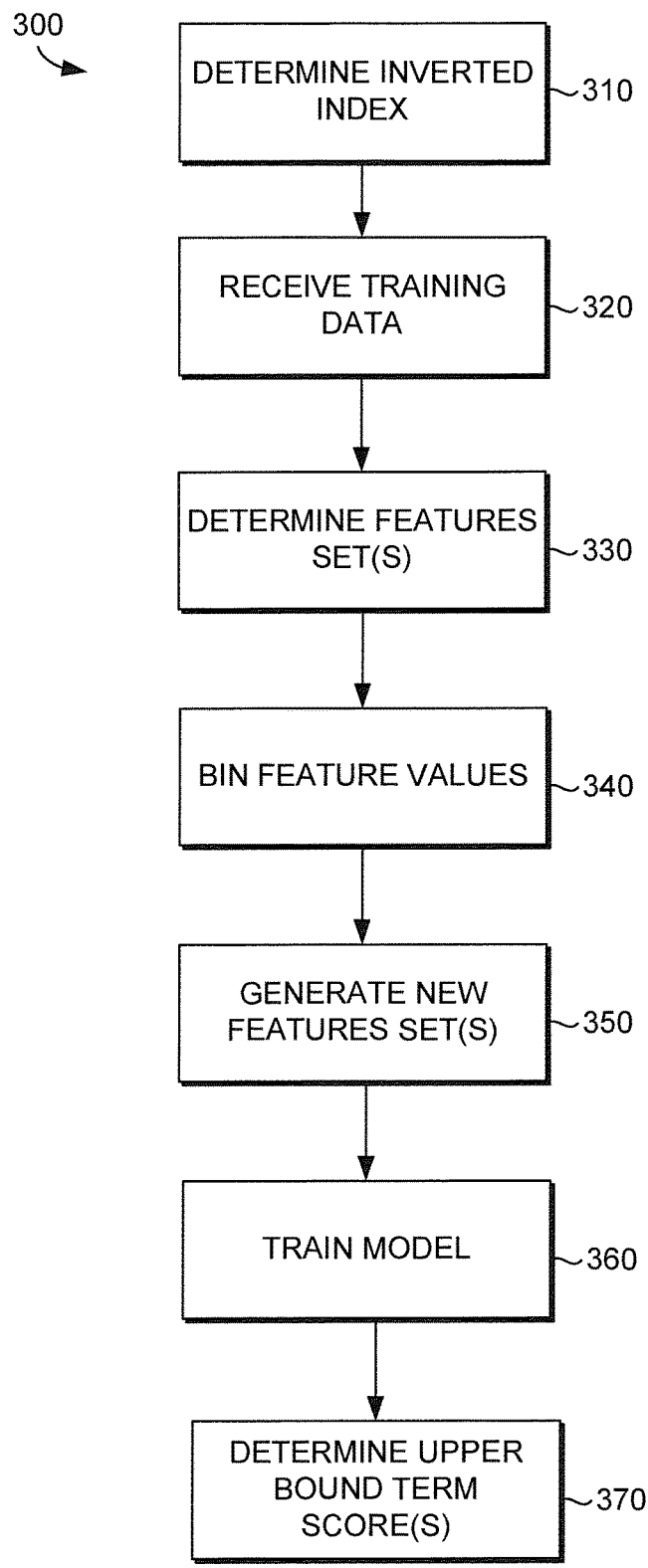
FIGS. 3 and 4 are flow charts showing a method of selecting relevant advertisements based on a machine-learning model, in accordance with an embodiment of the present invention.
Figure 4:
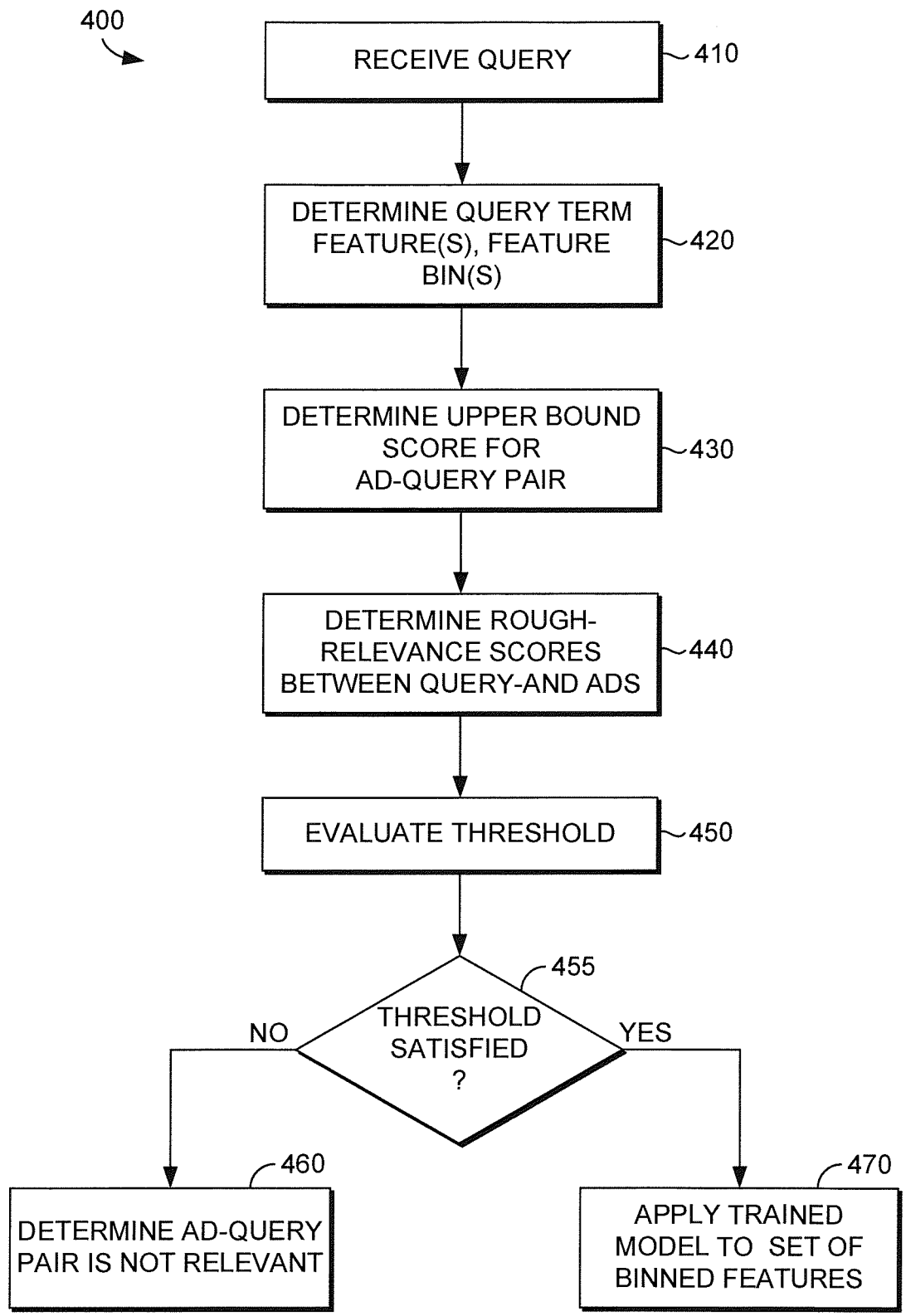

Turning now to FIGS. 3 and 4, methods and examples of machine learning based information retrieval for ad selection and aspects of such methods and examples are provided herein, in accordance with embodiments of the present invention. In these example embodiments, a novel set of features from query (reference) and ad (target) side are determined and a machine learning algorithm is applied to construct a scorer-model of (query, ads) which maximizes a relevance metric. Some of these embodiments are adaptable to utilize the high efficiency advantages of the WAND algorithm using a two-step score evaluation approach.

With reference to FIG. 3, a method 300 of training a machine-learning scorer is described, in accordance with an embodiment of the present invention. Method 300 may be performed by one or more computing systems, such as computing device 100 to train a machine-learning model, such as described in connection with machine-learning scorer component 224, to determine content similarity between reference, such as a user-submitted query and one or more target documents, such as advertisements, for use in selecting relevant ads for presentation to a user. In an embodiment, the machine learning scorer is pre-trained or trained in advance of determining relevance for use in advertisement selection, and in another embodiment the machine learning scorer is continuously trained and retrained so as to be adaptive. In an embodiment, the machine learning scorer is re-trained periodically, such as daily or when new information for training, such as click-data, becomes available.

At step 310, an inverted index of the target document is determined. In an embodiment, the target documents comprise advertisements. The inverted index maybe received or generated from the advertisement inventory corpus. For example, in an embodiment, the inverted index comprises one or more tokens representing a term or word or feature, wherein each token has an associated post listing which contains identifier(s) of target documents (including ads) which have that token in their metadata, or in their corpus.

At step 320, training data is received. As described above, training data is used for training the machine learning scorer and in an embodiment comprises user or publisher click data or other historical usage data, such as determined from records of searches and user responses from an online search engine. In an embodiment, the training data comprises a set of a query, one or more (target) documents, and a label indicating whether the document is relevant or not to the query. In an embodiment relevance is determined from the historical usage data using a proxy such as normalized click through rate (CTR) or click-over-expected-click (COEC), for example. From these user metrics proxies a relevance label can be approximated. In another embodiment, human judgment is used for evaluating query-document data for relevance for use as training data.

At step 330, one or more features sets are determined for ads (target) and query (reference) terms of training data. In one aspect, features represent the statistical and semantic meaning of the ads, query, match terms, and their mutual relationship, and the machine learning depends on a number of features for use as a predictor of relevance. In an embodiment a set of features is computed from matched terms of the ad and query training data. For example, some features may be derived from term frequency (TF), some features may be derived from inverse-document-frequency (IDF). Some features may be derived from the different types of the matched terms, e.g., unigram, phrase, entity.

At step 340, feature values are binned. In one embodiment, feature values are sorted into pre-defined bins, and in another embodiment clustering or other means are used to identify bins for clustering (or otherwise grouping) features, such as based on quantized values of the features. For example, in an embodiment the TF of a term are binned, such as for example by quantizing the TF feature as 0 to 100. In this manner, each bin becomes a feature usable for the machine learning scorer. Thus in an embodiment, tokens (terms) are grouped together. In another embodiment, the IDF feature is binned.

At a step 350, new feature sets are generated. In an embodiment, feature engineering for the machine learning model is divided into the query and ad sides. Features may be designed to meet two requirements: (a) making it possible to generate the term upper bound needed by the WAND algorithm, which can be determined at index time; and (b) the designed (generated) features are simple yet powerful enough to measure the relevance between query and ads effectively. In an embodiment, bins are cross-joined among different features for both query features and ad features. In this manner, cross joining bins among features (or joining bins among cross-product features) increases the discriminating power of the feature and simulates a non-linear model, where the model is linear Each bin can have a different weight in the model, which may be used to simulate a non-linear model with much higher capacity but with a linear model formula. In another embodiment, new features are generated in non-linear space. In an embodiment, the joined bins are used for model training. In one aspect, the derived query side features comprise: TermQueryWeightBin_TermQueryFreqBin_OtherQuerySideFeaturesBin; and the derived ad side features comprise: TermTypeBin_TermAdWeightBin_TermAdFreqBin_OtherAdSideFeaturesBin.

At step 360 the machine learning model or scorer is trained. In an embodiment, the model is trained based on the training data received in step 320 and new features sets determined in step 350. (As discussed above in connection to FIG. 2, the machine-learning model may be linear or non-linear, and in some embodiments, the selection of the model type is dependent on the application and/or data.) In one aspect, the machine learning model is used to determine the weights for the terms in a target document, and the reference. For example, in an embodiment, the machine learning model is used to learn the weights for each word in query and ad. The weight may be determined in order to minimize the function of Equation (1), above, such as by using an optimization algorithm such as L-BFGS.

At step 370, upper bound score(s) for terms are determined. In an embodiment, step 370 occurs on the target (ad) side, based on the available target documents (advertisements). In an embodiment, the upper bound scores are determined by the machine learned feature weight of the term. In an embodiment, the upper bound scorers for terms are determined by assigning the upper bound scorers as the largest feature weights that are associated with the term. In an embodiment, step 370 comprises determining the upper bound scorer of ad terms at indexing time (the term level upper bound). The upper bound score of a term may be calculated by the machine learned weight of the ad side feature triggered by the term, determined at indexing time. For example, in an embodiment, using a reverse index file such as described in connection to step 310, each post listing contains one or more terms or words and an upper bound is needed for each term (or word).

In particular, in embodiments using the WAND algorithm, the WAND algorithm uses the upper bound for each term to escape. For each term there is a weight for the term in each document in the set of target documents (e.g., ads), and the maximum weight for that term may be assigned as the upper bound for the term. In other words, determining the document that has the highest weight, and setting the upper bound to the value of that highest weight.

Turning now to FIG. 4, a method is presented for using a trained learning machine scorer for use in determining relevance between a reference (query) and one or more targets (ads) is described, in accordance with an embodiment of the present invention. Method 400 may be performed by one or more computing systems, such as computing device 100 to train a machine-learning model, such as described in connection with machine-learning scorer component 224, to determine content similarity between reference, such as a user-submitted query and one or more target documents, such as advertisements, for use in selecting relevant ads for presentation to a user.

At step 410 a query is received. In an embodiment, a query is received from a user or application process and is received at receiving component 222 of FIG. 2. In an embodiment the query is received at a paid search server. In an embodiment a query comprises a term or string of terms or other reference for use in determining a set of targets relevant to the reference. For example, determining search results and advertisements relevant to a search engine query. In an embodiment, step 410 further comprises: based on the received query, retrieving the post listings for all of the query terms, and retrieving the corresponding upper bound term score (determined in step 370 of method 300) for the terms.

At step 420, determine query term features and feature bins. In an embodiment, term features are calculated on the query side; the features are binned and cross-joined, similar to how the term features were determined, binned, and cross-joined on the ad side, as described in connection to step 330 of method 300. In an embodiment, the determined features on the query side are binned based on the feature value distributions determined at step 340 of method 300. In other word, the query is processed in a manner similar to the manner used to process the target documents (e.g., ads), such as described in method 300, so that a comparison may be performed between the query received in step 410 and the target documents (e.g., ads).

At step 430, an upper bound score is determined for the ad-query pair(s). A quick estimation of the relevance score between ads and query, such as applied by the WAND algorithm, depends on the upper bound scores of matched query terms between them. In an embodiment, the calculated term features determined in step 420 are combined with the upper bound score(s) determined in step 370 of method 300.

At step 440, a rough relevance score between the query and ad(s) is determined. In an embodiment the rough relevance score is determined based on the (query, ad) score upper bound determined in step 430. In an embodiment, based on this rough estimation of relevance, an ad determined as relevant will be applied to the machine learning scorer for a full evaluation of relevance using the complete set of binning features. Accordingly, in one aspect, an embodiment of step 440 serves as an "escape" for determining ad relevance by more efficiently eliminating those ad-query pairs that are below the relevance threshold in the top-N ads heap.

At step 450 and 455, the roughly estimated relevance scores of step 440 are compared to a threshold to determine if the ad query pair is not relevant and should be filtered out (step 460, because the threshold is not satisfied) or if the ad-query pair should be subject to a full evaluation of relevance using the full set of binning features (step 470) because the threshold is satisfied. In an embodiment the threshold comprises the heap threshold, which is a minimal relevance score of an ads heap which stores the top N most relevant ads found so far for the input query.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Embodiments of the present invention have been described in relation to particular embodiments, which are intended in all respects to be illustrative rather than restrictive. Alternative embodiments are possible without departing from its scope. It will be understood that certain features and subcombinations are of utility and may be employed without reference to other features and subcombinations. This is contemplated by and is within the scope of the claims.

The invention claimed is:

1. One or more computer-storage hardware devices having computer-executable instructions embodied thereon that, when executed by a computing device, cause the computing device to perform a method of determining relevant advertisements with a machine learning model based on a query, the method comprising:
    receiving training data for training a machine learning model, the training data comprising information indicating relevance between a set of reference and target documents, the documents comprising one or more training terms;
    determining one or more training data feature sets and corresponding training data feature values from the training terms of the training data, each feature set and values associated with a training term;
    generating, based on the training data feature sets and corresponding values, a cross-joined feature set of features comprising a combined first feature of a reference-document data feature and a second, different feature of a target-document feature;
    training the machine learning model by determining a set of weight parameters for each of the training terms by applying the one or more of the training feature sets, the cross-joined feature set, and values associated with the training term to the model;
    in response to a query, utilizing the model to determine a final measure of relevance between a query-target document and the query; and
    based on the final measure of relevance, causing the query-target document to be presented.

2. The one or more computer-storage hardware devices of claim 1, further comprising:
    receiving advertisement information comprising at least one advertisement document, each document including one or more advertising terms;
    based on the set of weight parameters, determining a first upper bound parameter value for each of the one or more advertising terms; and
    storing the first upper bound parameter value for each of the one or more advertising terms.

3. The one or more computer-storage hardware devices of claim 2, further comprising:
    the query comprising one or more query-terms;
    determining a set of query-features and query-bins from the query;
    from the query and advertising information, identifying ad-query pairs to be evaluated for relevance to each other, thereby forming a set of ad-query pairs;
    for each ad-query pair, based on the determined set of query-features and first upper bound parameter value for each advertising term:
        (1) determining a second upper bound parameter value for the ad-query pair;
        (2) determining a rough relevance for the ad-query pair; and
        (3) determining a difference between the rough relevance measurement and a threshold value to classify the ad-query pair as not relevant or potentially relevant.

4. The one or more computer-storage hardware devices of claim 3, further comprising:
    for each potentially relevant ad-query pair, determining a second measure of relevance by applying the machine learning model to the potentially relevant ad-query pair.

5. The one or more computer-storage hardware devices of claim 4, further comprising selecting one or more advertisements for presentation based on the second measure of relevance.

6. The one or more computer-storage hardware devices of claim 4, further comprising ranking the ad-query pairs based on the second measure of relevance for each ad-query pair.

7. The one or more computer-storage hardware devices of claim 1, wherein the training data comprises one of user click data, publisher click data and historical ad-query usage information.

8. The one or more computer-storage hardware devices of claim 3, wherein the threshold value comprises a top N most relevant ads heap threshold based at least on the term frequency or inverse document frequency of a term.

9. The one or more computer-storage hardware devices of claim 1, wherein the machine learning model type is non-linear.

10. The one or more computer-storage hardware devices of claim 1, wherein the machine learning model comprises an L-1 regularized logistic regression model.

11. The one or more computer-storage hardware devices of claim 10, wherein the logistic regression model is of the form:

$$\min_w \left\{ -\sum_i \{\log[P(R|(q, a)_i; w] * y_i + \log[1 - P(R|(q, a)_i; w] * (1 - y_i)\} + \alpha * \|w\|_1 \right\}; \quad (1)$$

$$P(R | (q, a); w) = \frac{1}{1 + e^{-w \cdot f}} \quad (2)$$

and wherein determining a set of weight parameters comprises minimizing w of equation (1).

12. A computer implemented method comprising:
receiving historical click-usage information comprising user-click or publisher click data for a set of advertisement and query documents, the documents comprising one or more training terms;
determining one or more training data feature sets and corresponding training data feature values from the training terms of the historical click-usage information, each feature set and values associated with a training term;
generating, based on the training data feature sets and corresponding values, a cross-joined feature set of features comprising a combined first feature of a query-document data feature and a second, different feature of an advertising-document feature;
training a machine learning model by determining a set of weight parameters for each of the training terms by applying one or more of the training feature sets, the cross-joined feature set, and values associated with the training term to the model;
receiving a second set of advertisement documents, each document of the second set including one or more advertising terms,
receiving a query comprising one or more query-terms;
identifying ad-query pairs to be evaluated for relevance to each other, thereby forming a set of ad-query pairs;
applying an adapted WAND algorithm using the set of weight parameters to the set of ad-query pairs to generate a set of potentially relevant ad-query pairs;
applying the machine learning model to the set of potentially relevant ad-query pairs to determine the relevance between each potentially relevant ad-query pair; and
based on the relevance between each potentially relevant ad-query pair, causing the advertising document to be presented.

13. The computer implemented method of claim 12, wherein the machine learning model comprises an L-1 regularized logistic regression machine learning model.

14. The computer implemented method of claim 12, wherein the query is received at an advertisement search service.

15. The computer implemented method of claim 12, further comprising:
determining an advertisement having the highest relevance based on the determined relevance ranking the potentially relevant ad-query pairs; and
selecting the advertisement having the highest relevance to be presented with the results of the query.

16. The computer implemented method of claim 15, wherein the machine learning model is further trained based on user-click and publisher click information associated with the selected highest relevance advertisement and received query.

17. A computerized system comprising:
one or more processors; and
computer storage memory having computer-executable instructions stored thereon which, when executed by the one or more processors, implement a method comprising:
receive training data for training a machine learning model, the training data comprising information indicating relevance between a set of reference and target documents, the documents comprising one or more training terms;
determine one or more training data feature sets and corresponding training data feature values from the training terms of the training data, each feature set and values associated with a training term;
generate, based on the training data feature sets and corresponding values, a cross-joined feature set of features comprising a combined first feature of a reference-document data feature and a second, different feature of a target-document feature;
train the machine learning model by determining a set of weight parameters for each of the training terms by applying the one or more of the training feature sets, the cross-joined feature set, and values associated with the training term to the model;
in response to a query, utilize the model to determine a final measure of relevance between a query-target document and the query; and
based on the final measure of relevance, cause the query-target document to be presented.

18. The computerized system of claim 17, wherein the machine learning model type is non-linear.

19. The computerized system of claim 17, wherein the machine learning model comprises an L-1 regularized logistic regression model.

20. The computerized system of claim 17, the method further comprising:
receive advertisement information comprising at least one advertisement document, each document including one or more advertising terms;
based on the set of weight parameters, determine a first upper bound parameter value for each of the one or more advertising terms; and store the first upper bound parameter value for each of the one or more advertising terms.

* * * * *

UNITED STATES PATENT AND TRADEMARK OFFICE
CERTIFICATE OF CORRECTION

PATENT NO. : 9,589,277 B2  
APPLICATION NO. : 14/145422  
DATED : March 7, 2017  
INVENTOR(S) : Ruofei Zhang, Jianchang Mao and Yuan Shen Page 1 of 1

It is certified that error appears in the above-identified patent and that said Letters Patent is hereby corrected as shown below:

On the Title Page

Column 1 (72) Inventors, please change the first inventor's name from "Bruce" to "Ruofei".

Signed and Sealed this
Twenty-fifth Day of April, 2017

Michelle K. Lee
*Director of the United States Patent and Trademark Office*